Dec. 25, 1962 T. F. WIDMER 3,070,715
MAGNETIC GRIPPING DEVICE HAVING A SERPENTINE FLUX PATH
Filed Sept. 17, 1958 3 Sheets-Sheet 1

Dec. 25, 1962 T. F. WIDMER 3,070,715
MAGNETIC GRIPPING DEVICE HAVING A SERPENTINE FLUX PATH
Filed Sept. 17, 1958 3 Sheets-Sheet 2

WITNESSES
INVENTOR
Thomas F. Widmer
BY
ATTORNEY

Dec. 25, 1962 T. F. WIDMER 3,070,715
MAGNETIC GRIPPING DEVICE HAVING A SERPENTINE FLUX PATH
Filed Sept. 17, 1958 3 Sheets-Sheet 3

United States Patent Office 3,070,715
Patented Dec. 25, 1962

3,070,715
MAGNETIC GRIPPING DEVICE HAVING A
SERPENTINE FLUX PATH
Thomas F. Widmer, Monroeville, Pa., assignor to Westinghouse Electric Corporation, East Pittsburgh, Pa., a corporation of Pennsylvania
Filed Sept. 17, 1958, Ser. No. 761,496
6 Claims. (Cl. 310—14)

The present invention relates to linear driving mechanisms and more particularly, to a magnetic gripping device for use in conjuction therewith.

The linear driving mechanism of the invention is readily adaptable for use in imparting incremental and stepwise movement to a linearly moveable element or driving shaft, particularly when the element or shaft is mounted for movement in a generally vertical path. For example, one or more of such shafts are employed in certain applications for moving an equivalent number of control members which are insertable into a reactional vessel for the purpose of initiating, terminating, or otherwise controlling a reaction being carried on within the vessel.

In other applications, the linear element or driving shaft is employed to impart movement to horizontally or vertically sliding doors and the like. In still other applications, a driving mechanism of the character described is employed to impose indexing movement upon gearing trains or other mechanical movements utilized in various production machinery.

In the aforementioned applications, the load-carrying capacity of the linear driving mechanism is limited by the conventional arrangement of the electro-magnetic gripping devices utilized therewith. The present invention contemplates means associated with the gripping device and with other components of the linear driving mechanism for improving the load-carrying capacity of the mechanism.

It is therefore an object of the invention to provide a novel and efficient linear driving mechanism.

Another object of the invention is to provide an improved electromagentic gripping device adapted for use in a linear driving mechanism.

A further object of the invention is to provide a linear driving mechanism with means for increasing the magnetic attraction between a linearly moveable element and a magnetic gripping device associated therewith.

Still another object of the invention is the provision of a lifting electromagnet having means associated therewith for increasing the magnetic attraction between the electromagnet and an object being lifted thereby.

A still further object of the invention is the provision of novel and efficient means associated with an electromagnet for producing a plurality of fluxile paths through an element attracted to the magnet in order to increase the magnetic attraction between the element and the magnet.

These and other objects, features and advantages of the invention will be made apparent during the forthcoming description of illustrative embodiments thereof with the description being taken in conjunction with the accompanying drawings, wherein.

In accordance with the invention, a linear driving mechanism of the magnetic-jack type is provided wherein a plurality of electromagnetic gripping coils are mounted in a manner to secure by magnetic attraction a linear element passing through the coils. Some of the coils are employed to secure the element to a fixed member, while others of the coils are employed to secure the element to a moveable member. The moveable member is moved in either direction of its travel respectively by a pair of additional or displacing coils. By sequentially energizing the two groups of gripping coils and one of the displacing coils, depending upon the direction of movement of the linear element, indexing movement is imparted to the linear element. Novel means are associated with the gripping coils, particularly with the magnetic circuits thereof, for increasing the magnetic attraction between the coils and the adjacent linear element. The linear element itself is modified pursuant to the invention in order to facilitate the flow of magnetic flux thereto.

Figure 1A:
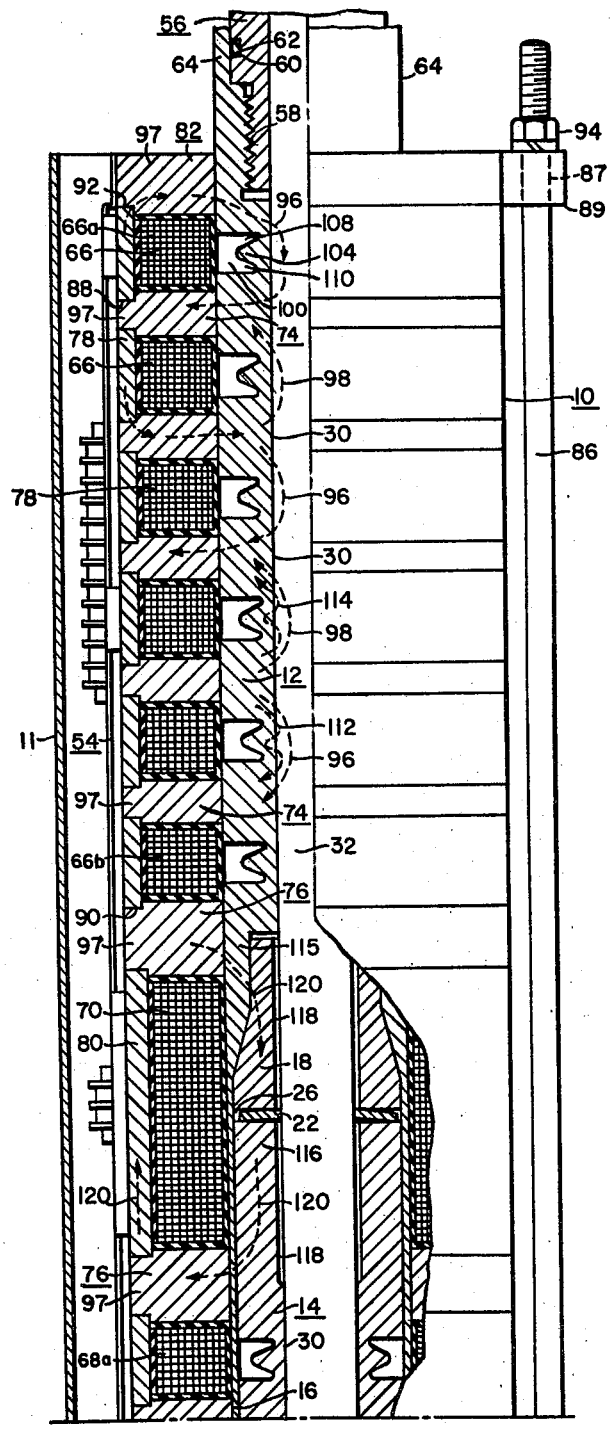
FIGURE 1A is a longitudinal, partially sectioned view of the upper portion, as viewed in the drawings, of a linear driving mechanism arranged in accordance with the invention.
Figure 1B:
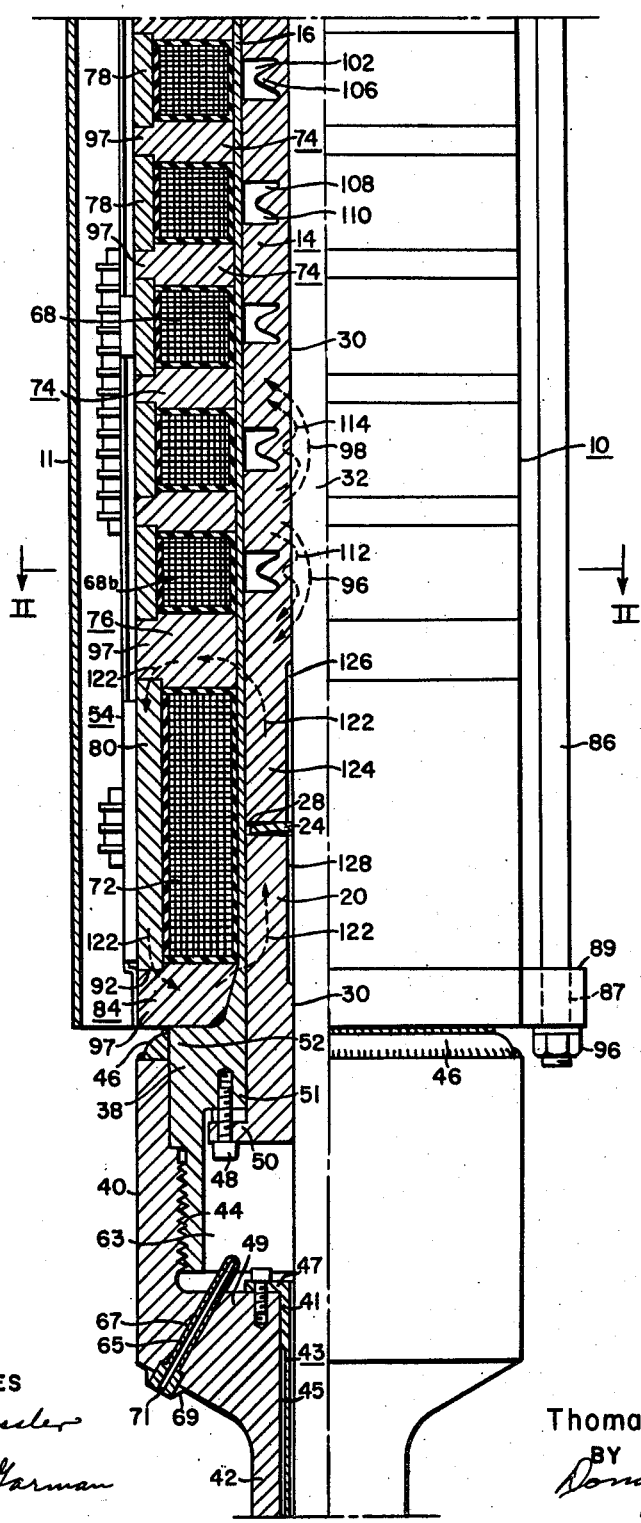
FIG. 1B is a longitudinal, partially sectioned view of the lower portion of the aforementioned linear driving mechanism.
Figure 2:
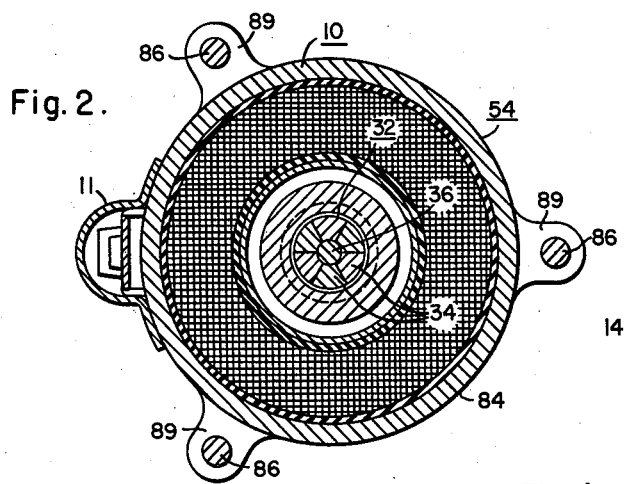
FIG. 2 is a cross-sectional view of the linear driving mechanism shown in FIG. 1B taken along reference line II—II thereof.

Referring now more particularly to FIGS. 1 and 2 of the drawings, the illustrative form of the invention therein comprises a generally tubular housing 10, a wiring conduit 11 secured to the outer surface of the housing 10, a fixed sleeve member 12, and a movable sleeve member 14. The housing 10 is composed of a number of parts, which in addition partially define the magnetic circuits of the aforementioned gripping and displacing coils. The movable sleeve member 14 is mounted within a tubular extension 16, which in this example, is secured to the fixed sleeve 12 and extends continuously from the outer peripheral surface of the fixed sleeve member 12. Upper and lower stop members 18 and 20, as viewed in FIGS. 1A and 1B in the drawings are arranged to define the limits of travel of the movable sleeve 16. A pair of conical springs 22 and 24 are mounted respectively in the gaps 26 and 28 formed between the movable sleeve 14 and the stop members 18 and 20 in order to position the movable sleeve 14 intermediately of the stop members 18 and 20 for purposes explained subsequently.

Each of the sleeve members 12 and 14, the stops 18 and 20, and the springs 22 and 24 are provided with a central passage or bore 30 extending therethrough. The aforementioned central passages 30, when aligned, form a continuous bore extending entirely through the linear motion device illustrated in FIGS. 1A and 1B. A linear element or driving shaft 32 is mounted for longitudinal movement within the bore 30 and, as better shown in FIG. 2 of the drawings, desirably comprises a bundle of sectorized rods 34, all of which extend substantially along the entire length of the driving shaft 32. The term "sectorized" denotes the cross-sectional configuration of the rods 34 which configuration is at least a portion of the sector of a circle as shown in FIG. 2. For ease in handling, a circular rod (not shown) can be inserted into the longitudinal, central cavity 36 of the driving shaft 32. It has been found that use of a linear shaft having this configuration considerably improves the magnetic attraction between the driving shaft and the electromagnetic arrangement presently to be described.

The linear driving mechanism of the invention as illustrated in FIGS. 1A, 1B and 2 is adapted particularly for use in conjunction with a sealed system into which the driving shaft 32 or a member secured thereto, is inserted for purposes of controlling the system or components thereof. For example, the driving shaft 32 can be coupled to a valve hermetically sealed or enclosed within the system for the purposes of manipulating the valve without destroying the integrity of the sealed system.

When the linear mechanism is employed in such applications, the tubular projection 16 of the fixed sleeve member 12 desirably is formed integrally therewith or secured thereto by means of an annular sealing weldment (not shown). In furtherance of this purpose, the extension 16 terminates at its lower end in a thickened portion 38 which is threaded into a flared end portion 40 of a conduit section 42, as denoted by the reference numeral 44. A tubular liner 43 is inserted through the central cavity 45 of the conduit 42 in order to define better the path of the linear driving shaft 32 into the sealed system. In furtherance of the purpose, the liner 43 is in lateral bearing contact with the inner wall surface of the conduit 42 only at an upper thickened end portion 41 of the liner. The remainder of the liner 43 is spaced from the inner surface of the conduit 42 and therefore is capable of a small amount of lateral deflection. This deflection is sufficient to compensate for any slight misalignment between the liner mechanism and the conduit 42, which may result from manufacturing tolerances or subsequent wear.

The liner 43 terminates at its upward end, as viewed in the drawings, in a flange 47 whereby the liner is bolted to an inward shoulder 49 formed in the conduit 42 adjacent its flared end portion 40. The conduit section 42 can be sealed if desired in a known manner to the aforesaid sealed system (not shown) with which the linear driving mechanism is to be employed. The junction between the thickened end portion 38 and the flared conduit portion 40 can be hermetically sealed if desired by means of a quarter-round sealing ring 46 which is welded at its lateral edges to the thickened portion 38 and the flared portion 40, respectively.

The thickened terminal portion 38 of the sleeve projection 16 in addition serves as a convenient means for mounting the lower stop member 20 through the use of a plurality of cap screws, one of which is designated by the reference numeral 48. The cap screws are inserted through openings in a flange 50 at the lower end of the stop 20 and are threaded into tapped apertures in an inward shoulder 51 of the terminal portion 38. The thickened end portion 38 is employed for the added function of providing a shoulder or stop 52 upon which the magnetic structure forming part of the linear driving mechanism and designated generally by the reference numeral 54 is supported.

The upper end of the linear driving mechanism, as better shown in FIG. 1A of the drawings, is closed by an elongated tubular housing 56, the lower end portion of which is shown in FIG. 1A. The housing 56 is threaded adjacent its lower end, as denoted by the reference numeral 58, whereby the housing 56 is joined to the upper end of the stationary sleeve member 12. The housing 56 at the same time is sealed to the stationary sleeve member 12 by means of a sealing ring 60 inserted in this example in an annular groove 62 formed in the outer periphery of the housing 56 adjacent the threaded portion thereof. When the housing 56 is thus joined to the sleeve 12, the sealing ring 60 is compressed between the bottom of the groove 62 and the inner periphery of a relatively short tubular projection 64 of the stationary sleeve member 12. The junction between the housing 56 and the projection 64 can be hermetically sealed, if desired, in the manner described previously in connection with the junction between the sleeve extension 38, the conduit 42 and the sealing ring 46. It is to be understood that the entire length (not shown) of the housing 56 will coextend with the driving shaft 32 at least to its upper limit of travel when the shaft 32 is fully withdrawn from the aforesaid sealed system. The upper terminus of the tubular housing 56 can be closed and sealed in any convenient manner.

With this arrangement then, a fluid contained within the aforementioned sealed system can circulate through the clearances between the driving shaft 32 and the conduit 42, sleeve members 12 and 14, and housing 56 without escape or leakage from the system via the linear driving mechanism. Within the flared conduit portion 40, a cavity 63 is formed between the adjacent end of the stop member 20 and the conduit liner 43. A thermocouple well 65 is inserted through an opening 67 extending through the conduit shoulder portion 49 and is sealed therein by means of an annular sealing weld 69. When thus mounted the thermocouple well 65 is adapted to receive in its central cavity 71, a thermocouple or other temperature-sensitive element (not shown) for determining the temperature of fluid being admitted to the linear driving mechanism.

In the arrangement of the invention as illustrated in FIGS. 1A, 1B and 2, the aforementioned magnetic structure 54 includes a first group of gripping electromagnets 66, a second group of gripping electromagnets 68, and a pair of positioning or displacing electromagnets 70 and 72. Each of these electromagnets is of generally annular configuration and thus surrounds the linear element or driving shaft 32. The first group of gripping magnets 66 are mounted adjacent the upper or fixed sleeve member 12 and are spaced along the length thereof, while the second group of gripping magnets 68 are mounted adjacent the lower or movable sleeve member 14 and are similarly spaced along its length. The positioning magnets 70 and 72 are mounted respectively adjacent the stop members 18 and 20.

The aforementioned electromagnets in this arrangement are maintained in their respective positions and spaced from one another by means of a plurality of washers fabricated from a good magnetic material such as carbon steel, silicon steel, or, in the event that the linear driving mechanism is employed in a corrosive environment, 405, (AISI) stainless steel or other magnetic stainless steel. 405 stainless steel is a ferritic type steel having good magnetic properties.

More specifically, the gripping electromagnets 66 and 68 are separated by relatively thin washers 74, while the positioning electromagnets 70 and 72 are separated from adjacent ones of the gripping magnets 66 and 68, respectively, by means of relatively thick spacing washers 76.

The spacing washers 74 and 76 are, in turn, spaced an amount equivalent to the width of the electromagnets 66 or 68 and 70 or 72, respectively, by means of tubular spacers 78 and 80 fabricated from a magnetic material. The magnetic structure 54 is completed by a pair of end rings 82 and 84 joined to the ends thereof and employed in conjunction with a plurality of tie rods 86 (FIG. 2) to maintain the magnetic structure 54 and particularly the spacing washers 74 and 76 and the tubular spacers 78 and 80 in compression.

Each tie rod 86 is inserted through apertures 87 in a pair of outwardly extending tabs 89 secured respectively to the end rings 82 and 84. The spacing washers 74 and 76 and the tubular spacers 78 and 80 are aligned by means of annular offsets 88 and 90 formed respectively on the outer lateral surfaces of each spacing washer 74 or 76 respectively. Similar offset portions 92 are formed on the adjacent lateral surface of each end ring 82 or 84. When assembled, the ends of each tubular spacer 78 or 80 are inserted respectively into the adjacent pair of the offsets 88, 90 or 92. Compressive force is applied to the end rings 82 and 84 and the balance of the magnetic structure 54 by means of mounting nuts 94 and 96 threaded to the respective ends of the tie rods 86. The major proportion of the compressive force imparted to the magnetic structure 54 is born, however, by the offset portions 97 of the spacing washers 74 and 76 and by the tubular spacers 78 and 80.

The magnetic circuits of each of the gripping electromagnets 66 and 68 are defined by the adjacent spacing washers 74 and by the tubular spacers 78 with the exception of the outermost ones of each group of electromagnets 66 and 68. The magnetic circuit of the uppermost electromagnet 66a is completed by the end ring 82 and the adjacent tubular spacer 78 and spacing washer 74. The remainder of these outermost electromagnets 66b, 68a and 68b are provided with low reluctance magnetic paths by means of the adjacent one of the larger spacing washers 76 associated with the positioning magnet 70 or 72 and by the adjacent tubular spacer 78 and spacing washer 74. In a similar manner, the magnetic fluxile path of the positioning magnet 70 is defined by adjacent spacing washers 76 and the relatively large tubular spacer 80, while the positioning magnet 72 similarly is associated with the lower end ring 84 and with the adjacent tubular spacer 80 and spacing washer 76. The polarities of adjacent electromagnets are reversed respectively so that the magnetic circuits thereof will not interfere with one another as indicated by the arrows 96 and 98.

When the magnetic structure 54 is mounted with its lower end ring 84 in engagement with the supporting shoulder 52 of the sleeve extension 16, each of the gripping magnets 66 or 68 is juxtaposed to one of a plurality of rather deep grooves 100 or 102 formed respectively in the outer surface of the stationary sleeve member 12 or the movable sleeve member 14. Thus, the number of grooves 100 and 102 is equivalent to that of the gripping magnets 66 or 68, and the grooves extend circumferentially about the outer periphery of the associated sleeve member. The grooves 100 and 102 are employed to force the magnetic flux of the electromagnet associated therewith through the sleeve member 12 or 14 and into the adjacent portion of the segmented driving shaft 32, as denoted by the arrows 96 and 98. The flow of the magnetic flux in this manner causes each of the sectorized drive shaft segments to be moved outwardly and radially into frictional contact with the bore 30 of the linear driving mechanism. The movement of the drive shaft segments stems, of course, from the well-known tendency of magnetic circuits to eliminate gaps therein. The frictional engagement of the driving shaft with either the stationary sleeve 12 or the movable sleeve 14 is sufficient to support the driving shaft with a relatively large load secured thereto, although the driving shaft is mounted in a vertical position thereof. For maximum load carrying capacity, the electric characteristics of each electromagnet coil 66 or 68 are selected so that the magnetic materials of the adjacent portions of the segmented driving shaft 32 are at least nearly saturated when the associated coil 66 or 68 is energized.

In this arrangement of the invention, the magnetic attraction between the driving shaft and each electromagnet 66 or 68 is increased still further by a structural modification of the magnetic circuit so that a portion of the magnetic flux flowing from the sleeve member 12 or 14 to the driving shaft 32 is caused to recross the gap or junction between the sleeve member and adjacent portion of the driving shaft several times, that is to say, more than twice as would be the case in conventional arrangements. As is well known, the magnetic attraction between an electromagnet and a magnetic member juxtaposed thereto is dependent upon the number of magnetic line crossings at the gap or junction between the electromagnet and the magnetic member.

One arrangement for increasing the number of the aforementioned line crossings includes the use of an annular projection 104 or 106 extending outwardly from the innermost or bottom wall surface of each groove 100 or 102. Desirably the projections 104 and 106 are disposed centrally of the grooves 100 and 102 respectively so that the inner portion of each groove is subdivided into a pair of annular indents 108 and 110. The indents 108 and 110 desirably extend as near as practical to the inner peripheries of the sleeve members 12 and 14 so that only a relatively high reluctance path for the magnetic circuit of each coil 66 or 68 extends through the adjacent portion of the sleeve member 12 or 14. Alternatively, non-magnetic inserts can be placed in each sleeve member 12 or 14 at positions occupied by the indents 108 and 110, as described subsequently in connection with FIG. 5.

With this arrangement then, most of the magnetic flux of each coil 66 or 68 passes initially to the adjacent portion of the driving shaft 32 and travels therethrough in the directions indicated by the arrows 96 and 98. However, since the magnetic circuits of each of the gripping magnets 66 and 68 are at least very nearly saturated, the annular projections 104 and 106 furnish an alternate, relatively low reluctance path as indicated by the arrows 112 and 114, for some of the magnetic flux initially flowing into the adjacent portions of the driving shaft 32. Thus it is seen that that portion of the magnetic flux flowing along the alternate path denoted by the arrows 112 and 114 crosses the gap or junction between the driving shaft and the sleeve member a total of four times, due to the presence of the annular indents 108 and 110 of each groove 100 or 102, instead of only twice, as in the case of the remaining magnetic flux. As a result, that part of the lifting force of each electromagnet attributed to that portion of the magnetic flux following the alternate paths 112 and 114 approximately is doubled, assuming flux density is relatively high. This follows from the fact that the number of line crossing of the latter portion of magnetic flux is likewise doubled. The flow of magnetic flux along the alternate paths 112 and 114 is facilitated by the additional fact that the segmented drive shaft 32 is provided with a sectorized configuration in order to diminish the average gap width between the driving shaft 32 and the sleeve members 12 and 14.

In the operation of the linear driving mechanism the groups of gripping coils 66 and 68 are energized intermittently but alternately, while one of the positioning coils 70 or 72 is energized intermittently but substantially simultaneously with the lower gripping coils 68 to impart movement to the sleeve member 14, and hence to the driving shaft 32 when the latter is secured to the movable sleeve member. This operational sequence imparts an incremental or indexing movement to the driving shaft by means of the movable sleeve 14 as described hereinafter in greater detail. Thus the driving shaft 32 can be advanced or withdrawn relative to the sealed system with which the linear mechanism of FIGS. 1A and 1B is employed.

In order to move the sleeve member 14 upwardly, together with the driving shaft 32, the positioning magnet 70 is energized intermittently but immediately upon each energization of the gripping coils 68 associated with the movable sleeve member 14. In this arrangement, the magnetic circuit of the positioning magnet 70 includes the spacing washers 76 and the tubular spacer 80, as noted heretofore, and the lower end portion 115 of the fixed sleeve 12, exclusive of its tubular extension 16. The flow of magnetic flux through the end portion 115 is facilitated by means of the magnetic stop member 18 which is closely fitted with the end portion 115 and which also defines the upper limit of travel of the movable sleeve member 14. The magnetic circuit of the positioning magnet 70 is substantially completed by the upper end portion 116 of the movable sleeve member 14, save for the aforementioned gap 26. Upon each energization of the magnet 70, then, the sleeve member 14 moves upwardly in an effort to reduce or eliminate the gap 26 and to complete the magnetic circuit insofar as possible. This action of course compresses the annular spring 22 to permit an increment of upward movement of the sleeve member 14.

The clearances 118 between the stop member 18 or the adjacent sleeve member portion 116 and the driving shaft 32 are made larger than that between the remaining portions of the sleeve members 12 and 14 and those portions of the driving shaft which are adjacent the gripping coils 66 or 68 so that a significant amount of magnetic flux will not flow through that portion of the driving shaft 32 adjacent the positioning magnet 70, even when the driving shaft segments 34 are expanded, to interfere with the magnetic circuit of the latter. Thus, the flux of the electromagnet 70 flows substantially through the path denoted by arrows 120 and described previously.

The movable member 14 and driving shaft 32 are actuated in the downward direction thereof, as viewed in FIG. 1B of the drawings, by similar operation of the positioning electromagnet 72. The magnetic circuit of the positioning magnet 72 takes the path denoted by arrows 122 and includes the lower end ring 84, the tubular spacer 80, the spacing washer 76, and the lower stop member 20. In this arrangement however, the magnetic circuit is completed, save for the gap 28, by means of lower end portion 124 of the movable sleeve 14. Thus, when the electromagnet 72 is energized, the movable sleeve 14 is drawn downwardly against the stop member 20 in order to minimize the gap 28 insofar as possible. Repeated energization of the positioning magnet 72 with the lower gripping coils 68 produces downward increments of movement in the sleeve member 14 and the shaft 32.

The clearances 126 and 128 between the lower sleeve member portion 124 or the stop member 20 and the driving shaft 32 are increased for the purposes pointed out heretofore in connection with the clearances 118. The annular springs 22 and 24 desirably are fabricated from a magnetic material in order to increase insofar as possible the magnetic attraction between the ends of the movable sleeve member and the stop members 18 or 20, respectively, by reducing the effective widths of the gaps 26 and 28 when the positioning magnets 70 or 72 are energized.

Although it is possible to energize only one of the positioning magnets 70 or 72 together with alternate operation of the gripping magnets 66 and 68 as aforesaid to impart the aforesaid incremental movement to the driving shaft 32 in only one direction of its travel, it may be desirable in certain applications to energize both positioning magnets 70 and 72 alternately in order to ensure the reverse movement of the movable sleeve 14, when the latter is released by the gripping coils 68, instead of relying entirely upon the springs 22 and 24. Obviously, such return could be impeded by friction between engaging parts, by residual magnetism, or by wear or loss of tension in the springs 22 and 24. More particularly, alternate energization of the positioning magnets 70 and 72 is desirable to position the movable sleeve member 14 against the opposite stop member during its reverse movement, whereby each increment of movement thereof is increased.

The sequential operation of all of the gripping coils 66 and 68 and the positioning magnets 70 and 72 will now be described. Assuming that the driving shaft 32 is to be moved upwardly, the gripping magnets 68 are energized to secure the segments 34 of the driving shaft to the movable sleeve 14 in the manner described heretofore. The positioning coil 72 is deenergized and the positioning coil 70 is then energized to move the sleeve 14 upwardly against the upper stop 18. The gripping electromagnets 66 are energized following completion of this upward incremental movement of the sleeve 14 so that the driving shaft 32 then is secured to the fixed sleeve member 12.

The drive shaft having been thus secured, the gripping magnets 68 and the positioning coil 70 are released allowing the movable sleeve 14 to move downwardly under impetus of the annular springs 22 and 24, or alternatively by energizing the electromagnet 72 to move the sleeve 14 downwardly to a position against the stop member 20. The lower group of gripping magnets 68 then are energized while maintaining energization of the electromagnet 72 to secure the driving shaft to the movable sleeve 14. Following this operation, the upper group of gripping magnets 66 and the positioning electromagnet 72, if used at this time, are deactivated to release the driving shaft from the fixed sleeve 12 and to free the movable sleeve 14 from the action of the positioning magnet 72, respectively. Substantially at the same time the upper positioning magnet 70 is energized while maintaining energization of the lower gripping coils 68 in order to impart another incremental movement in the upward direction to the movable sleeve 14 and the shaft 32. Sequential energization of the electromagnets 66 and 68 and 70 and 72 is continued in this manner until the desired extent of travel of the driving shaft 32 in the upper direction thereof has been attained. Although a greater or lesser increment of movement can be imparted through the movable sleeve 14 by varying the width of the gaps 26 and 28, it should be appreciated that the maximum width of these gaps is limited by that displacement of the grooves 102 of the movable sleeve 14 relative to the associated gripping magnets 68 which would interfere with the magnetic circuit of each of these magnets.

In order to move the driving shaft 32 in a downward direction the operation of the positioning magnets 70 and 72 in the aforedescribed sequence is reversed. Thus, after energizing the gripping magnets 68 and deenergizing the upper positioning magnet 70, the lower positioning magnet 72 is energized to move the sleeve member 14 and the driving shaft 32 downwardly to a position delineated by the stop member 20. The upper gripping magnets 66 are then energized to secure the driving shaft to the fixed sleeve member 12 after which the electromagnets 68 and 72 are deenergized. The positioning magnet 70 then is energized to return the movable sleeve to its starting position adjacent the upper stop 18 and the sequential operation of the electromagnets is repeated to impart successive downward increments of motion to the driving shaft 32. It should be appreciated of course that when moving the driving shaft 32 downwardly operation of the positioning magnet 72 can be omitted and the movable sleeve 14 and the driving shaft 32 can be carried downwardly by weight of the latter until the movable sleeve 14 reaches a position against the stop 20.

As indicated heretofore it is contemplated that the driving mechanism can be operated in a similar manner in a horizontal position thereof and the sequential operation of the electromagnets in either direction of movement of the driving shaft will be substantially the same as that described heretofore with the exception of course that the weight of the driving shaft would not be available to supplant the operation of one of the positioning magnets, such as described previously in connection with the positioning magnet 72.

Figure 3:
FIG. 3 is a schematic circuit diagram of one form of controlling circuitry adaptable for use with the linear driving mechanism of the invention.

Referring now to FIG. 3 of the drawings, on arrangement of electrical circuitry for operating the linear driving mechanism 10 is illustrated therein. In this application of the invention, the driving shaft 32 is denoted by the dashed line 130 while the gripping and positioning electromagnets are denoted by the reference characters 66', 68', 70' and 72', respectively. Each of the gripping electromagnets 66' associated with the fixed sleeve member 12 as aforesaid are connected in electrical parallel to a pair of electrical leads 132. The remaining group of gripping magnets 68', which are associated with a movable sleeve 14, are connected similarly to conductors 134. Finally, the positioning magnets 70' and 72' of FIG. 3 are connected respectively to pairs of electrical conductors 136 and 138. Each of the conductors 132, 134, 136 and 138 are connected to output terminals 139 of a conventional cam or other form of rotating switch denoted by the reference numeral 140 and labeled switching means in FIG. 3. The switching means 140 in turn is coupled to a source of electric potential (not shown) through leads 142. The switching means 140 when operated by a suitable drive 141 is arranged to supply energizing potential in the aforedescribed sequential manner to the gripping magnets 66', then to the gripping magnets 68' and to one of the positioning magnets 70' or 72' depending upon whether the linear driving mechanism is to be operated in its forward or reverse direction and then again to the first group of gripping magnets 66' and at the same time to the other of the positioning magnets 70' or 72', if the latter is to be used in aiding reverse movement of the sleeve member 14.

Figure 4:
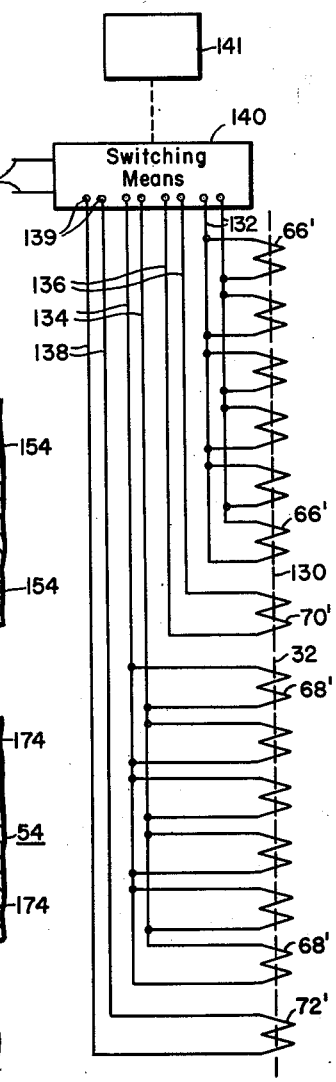
FIG. 4 is a partial, longitudinally sectioned view of another form of linear driving mechanisms according to the invention.
Figure 4:
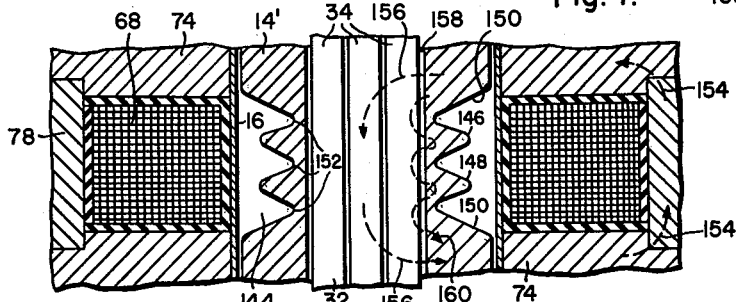

Referring now to FIG. 4 of the drawings, a modification of the linear driving mechanism is shown therein. In the arrangement of FIG. 4, similar reference characters refer to similar parts of the driving mechanism illustrated in FIGS. 1A, 1B and 2. The driving mechanism of FIG. 4 is substantially similar to that shown in earlier figures with the exception that the magnetic circuit of each of the gripping magnets 66 and 68 has been modified to increase still further the number of magnetic line crossings relative to the gap or junction between the driving shaft and the fixed sleeve 12 or the movable sleeve 14. Although in FIG. 4 only one of the gripping electromagnets 68 is shown, the modification of FIG. 4 is applicable equally to all of the gripping magnets 66 and 68. Each of the gripping magnets 66 or 68 is juxtaposed to one of a plurality of modified grooves formed in each of the sleeve members 12 and 14 and spaced in a manner similar to that of the aforedescribed grooves 100 and 102 respectively. These modified grooves are substantially similar to each other and accordingly only one such groove 144 is illustrated in FIG. 4 as being formed in the movable sleeve member 14'. On the bottom or inward surface of each groove 144 a pair of substantially equal annular projections 146 and 148 are formed. These projections 146 and 148 are spaced from one another and from the side walls 150 of the annular groove 144 in order to divide the groove 144 into three indented portions 152.

The structural members of the driving mechanism shown in FIG. 4 are formed from magnetic materials, as denoted previously in connection with FIGS. 1A, 1B and 2 so that the magnetic circuit of the coil 68 is completed as denoted by arrows 154 and 156. As in the arrangement of FIGS. 1A, 1B and 2, the major proportion of the magnetic flux passes directly into the adjacent portion of the driving shaft 32 as denoted by the arrow 156. However, since the electromagnet is driven so that the adjacent portion of the shaft 32 is at least nearly saturated as explained previously, a small proportion of the magnetic flux is caused to cross and recross gap 158 between the sleeve member 14' and the drive shaft 32 as denoted by arrow 160. This is due to the aforesaid saturated or near saturated condition of the magnetic circuit, to the lower reluctance path offered by the projections 146 and 148, and to the presence of the annular indents 152. With this arrangement, the magnetic attraction of each gripping magnet 66 or 68 is increased still further than that of the magnetic circuit arrangement illustrated and described in connection with FIGS. 1A to 2 as a result of a portion of the magnetic flux having been caused to cross the gap 158 a total of six times as compared with four times in the arrangement of earlier described figures. It can be shown that the attractive force or lifting power of each electromagnet 66 or 68 can be increased in the order of 20% in the arrangement of FIGS. 1A to 3 and in the order of 25% in the arrangement of FIG. 4 assuming that the total or open end width of the groove 144 is not increased substantially beyond that of each groove 100 or 102. This increase in magnetic attractiveness is in addition due to that occasioned by use of the sectorized driving shaft 32 described previously.

Figure 5:
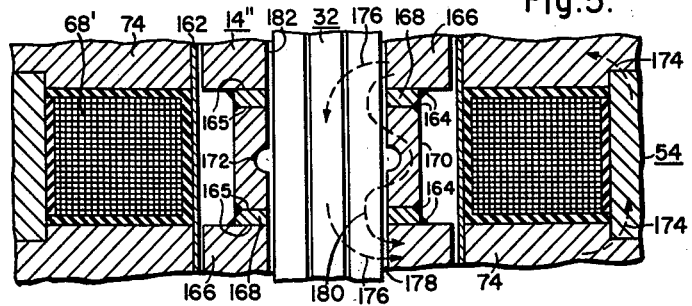
FIG. 5 is a partial, longitudinally sectioned view of still another form of linear driving mechanism arranged pursuant to the invention.

Referring now to FIG. 5 of the drawings, still another form of the linear driving mechanism is illustrated herein and likewise is adapted particularly for use in sealed or pressurized fluid applications. The overall arrangement of the linear driving mechanism is similar to that shown in FIGS. 1A to 2; however, the magnetic circuits of each of the gripping coils 66 or 68 is modified together with the structure of the sleeve members 12 and 14. In the arrangement of FIG. 5, each of the fixed and movable sleeve members are inserted in tandem within a tubular housing 162. The upper or fixed sleeve member (not shown) is secured to the housing 162 as by welding or the like, and the lower or movable sleeve member 14" is loosely mounted therein between a pair of springs and stop members (not shown) similar to the mounting arrangement for the movable sleeve 14 of FIGS. 1A and 1B. The magnetic structure 54 is mounted upon the exterior of the housing 162 and in the arrangement of FIG. 5 only one coil 68' thereof is shown. Each of the fixed and movable sleeve members, for example the movable sleeve member 14", is fabricated from a plurality of washers or spacers presently to be described. Each of the washers or spacers are secured to adjacent washers or spacers by any suitable means, for example by at least three spot welds formed at each junction 165 therebetween. These welds, some of which are designated by reference numerals 164, desirably are spaced (not shown) evenly about the outer periphery of each junction 164.

Specifically, each sleeve member is formed from a plurality of spaced relatively thick washers 166 which are aligned along the length of the sleeve member with the spacing washers 74 inserted between each of the gripping magnets 66 or 68. Each pair of adjacent washers 166 are maintained in their spaced relation by a pair of relatively thin washers 168 and a tubular spacer 170 inserted between the thin washers 168. For purposes hereinafter to be described, the tubular spacer 170 is provided with a central circumferential groove 172 formed upon its inner periphery.

The thick washers 166 and the tubular spacer 170 are formed from a good magnetic material while the thin washers 168 are formed from a non-magnetic material. In the event that the linear driving mechanism is employed in a corrosive environment, the magnetic components 166 and 170 desirably are formed from a magnetic stainless steel such as AISI 405, while the thin washers 168 are formed from a non-magnetic stainless steel such as AISI 304. Other combinations of magnetic and non-magnetic materials can be employed depending upon the application of the invention.

A portion of the magnetic circuit of each gripping magnet, for example 68', is defined by the structural components of the magnetic structure 54, as described previously and as denoted by arrows 174. From the magnetic structure 54 the flux passes radially through the relatively thin housing 162 and thence passes through the thick washers 166 and the adjacent portion of the drive shaft 32 as denoted by arrows 176. However, because the magnetic circuit is at least nearly saturated, as mentioned previously, a proportion of the magnetic flux is caused to recross the gap 178 between the driving shaft 32 and the movable sleeve 14" as denoted by arrow 180. This is induced by the magnetic tubular spacer 170, which is magnetically insulated from the thick washers 166 by means of the non-magnetic washers 168. The presence of the circumferential groove 172 in the inner surface of the spacer 170 serves to concentrate the magnetic flux passing through the tubular spacer and thereby serves to prevent interference between these lines of flux at adjacent crossings of the gap 178.

Each of the thick washers 166, the thin washers 168, and the tubular spacer 170 are provided with central bores 182 of equal diameter so that these components of the sleeve member when assembled form a continuous, smooth passage therethrough through which the driving shaft 32 extends. Accordingly, when the rods 34 composing the drive shaft 32 are expanded against the bore 182 an optimum of frictional engagement between the bore 182 and the driving shaft rods 34 is obtained.

Figure 6:
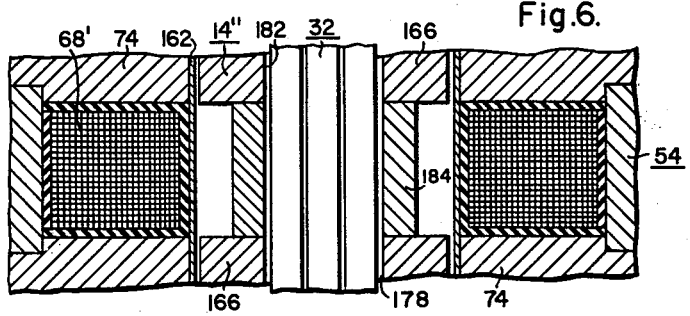
FIG. 6 is a partial, longitudinally sectioned view of still another form of linear driving mechanism presented here for purposes of comparison.

FIG. 6 has been included for the purpose of demonstrating the advantage of forcing a portion of the magnetic flux of each gripping magnet 66 or 68 to cross the gap 178 a total of four times in this arrangement, that is to say, to assume the serpentine path denoted by the arrow 180. Thus, it has been determined that the lifting power or attractive force of the electromagnet shown in FIG. 5 is approximately 20% greater than the electromagnet of FIG. 6. The modifications of FIGS. 5 and 6 are identical, including the sectorized driving shafts 32, save for the substitution of the tubular spacer 184 of FIG. 6 for both the tubular spacer 170 and the non-magnetic washers 168 of FIG. 5.

From the foregoing, it will be seen that there are disclosed herein novel and efficient forms of a linear driving mechanism and of an electromagnet adapted in one application for use with the driving mechanism. Obviously, however, the principles of the invention can be adapted to lifting electromagnets generally, or the like, by forcing a portion of the magnetic flux of the magnet to cross more than twice the junction between the magnet and the element being attracted thereto.

The foregoing illustrative and descriptive materials have been presented for the purpose primarily of exemplifying the invention and should not be interpreted as limitative thereof. Moreover, it is to be understood that certain features of the invention can be employed without a corresponding use of other features thereof. Accordingly, numerous embodiments of the invention will occur to those skilled in the art without departing from the spirit and scope of the invention.

Therefore what is claimed as new is:

1. An electromagnet comprising a coil, a magnetic structure substantially surrounding said coil to define a magnetic circuit of said coil, a portion of said magnetic structure being shaped for engagement with an object to be attracted to said electromagnet, said portion being formed solely of magnetic material and in addition being shaped to provide a serpentine path for the magnetic flux of said coil when energized, whereby a portion of said flux crosses the junction between said structure portion and said object at least four times.

2. An electromagnet comprising a coil, a magnetic structure substantially surrounding said coil to define a magnetic circuit of said coil, a portion of said magnetic structure being formed solely from magnetic material and being shaped for engagement with an object to be attracted to said electromagnet, said structure portion having a relatively deep groove therein whereby the magnetic flux of said coil is caused to flow into said object, at least one projection formed on that wall of said groove adjacent said object and spaced from the remaining walls of said groove whereby a portion of said flux is diverted from said object through said projection and returned to said object in order to cause said flux portion to cross the junction between said structure portion and said object more than twice.

3. An electromagnet comprising an annular coil, an annular magnetic structure substantially surrounding said coil to define a magnetic circuit of said coil, a tubular portion of said magnetic structure being formed solely from magnetic material and being shaped for engagement with an object disposed with said tubular portion to be attracted to said electromagnet, said tubular portion having a relatively deep circumferential groove in the outward surface thereof whereby the magnetic flux of said coil is caused to flow into said object, at least two outwardly extending circumferential projections disposed on the inner wall of said groove, said projections being spaced from one another and from the remaining walls of said groove, whereby a portion of said flux is diverted from said object through each of said projections and returned to said object in order to cause said flux portion to cross the junction between said structure portion and said object more than twice.

4. A linear driving mechanism comprising a plurality of electromagnets spaced along the length thereof, an elongated driving shaft, means for mounting said driving shaft for linear movement adjacent said magnets, a magnetic structure for defining the magnetic circuit of each of said magnets and for directing the magnetic flux of a number of said magnets to adjacent portions of said driving shaft, a tubular portion of said structure being formed solely of magnetic material and receiving said driving shaft therein, and said tubular portion having a pair of recesses therein at positions juxtaposed to said number of magnets, respectively, for causing a portion of the magnetic flux of each of said last-mentioned magnets to cross the junction between said magnetic structure and said driving shaft more than twice, and means for energizing sequentially said electromagnets to effect linear movement of said driving shaft.

5. A linear driving mechanism comprising a plurality of electromagnets spaced along the length thereof, an elongated driving shaft, means for mounting said driving shaft for linear movement adjacent said magnets, a magnetic structure for defining the magnetic circuit of each of said magnets and for directing the magnetic flux of a number of said magnets to adjacent portions of said driving shaft, a portion of said structure being formed solely from magnetic material and being shaped to engage said driving shaft, magnetic means associated with each of a number of said magnets for causing a portion of the magnetic flux of each of said last-mentioned magnets to cross the junction between said magnetic structure and said driving shaft more than twice, said magnetic means forming a part of said structure portion, said magnetic means in addition including a relatively deep groove formed in said structure portion adjacent each of said last-mentioned magnets and extending transversely of the path of said magnetic flux and a continuous projection extending from that wall of said groove adjacent said shaft and spaced from the remaining walls of the groove, said projection being fabricated from magnetic material whereby a path of lower reluctance is offered to a portion of the magnetic flux flowing into the adjacent portion of said driving shaft, and means for energizing sequentially said electromagnets to effect linear movement of said driving shaft.

6. A linear driving mechanism comprising an elongated driving shaft, a tubular member formed solely from magnetic material surrounding said driving shaft, a plurality of axially spaced electromagnets mounted on the exterior of said tubular member, a magnetic structure for defining the magnetic circuit of each of said electromagnets, said magnetic structures including portions to said tubular member, respectively, and being formed to direct magnetic flux along a path through said portions and said driving shaft, said tubular member portions being shaped to engage said driving shaft, means associated with each of a number of said magnets for causing a portion of the magnetic flux of each of said last-mentioned magnets to cross the junction between said magnetic structure and said driving shaft more than twice, said last-mentioned means comprising a relatively deep circumferential groove formed in each of said tubular member portions adjacent each of said last-mentioned magnets, and at least one continuous circumferential projection disposed in each of said grooves and secured to the inward walls thereof, respectively, each of said projections being spaced respectively from the remaining walls of said grooves, said projection in addition being fabricated from a magnetic material whereby a path of lower reluctance is offered to a portion of the magnetic flux flowing into the adjacent portion of said driving shaft, and means for energizing sequentially said electromagnets to effect linear movement of said driving shaft.

References Cited in the file of this patent

UNITED STATES PATENTS

| | | |
|---|---|---|
| 2,631,423 | Sullivan et al. | Mar. 17, 1953 |
| 2,803,761 | Young | Aug. 20, 1957 |
| 2,918,610 | Briggs | Dec. 22, 1959 |